United States Patent Office 3,442,944
Patented May 6, 1969

3,442,944
METHOD FOR PREPARING BETA-ALLYLAMINOPROPIONAMIDES
Donald M. Fenton, Anaheim, Calif., assignor to Union Oil Company of California, Los Angeles, Calif., a corporation of California
No Drawing. Filed Aug. 16, 1966, Ser. No. 572,695
The portion of the term of the patent subsequent to May 28, 1985, has been disclaimed
Int. Cl. C07c *103/12, 87/24*
U.S. Cl. 260—561                                        8 Claims

ABSTRACT OF THE DISCLOSURE

Allyl amines are oxidized to beta-allylaminopropionamides with a soluble metallic salt such as the mercuric salts of strong mineral acids or of $C_1$–$C_6$ alkanoic acids or with mercuric oxide. The oxidation is performed at temperatures from 25° to 350° C. in liquid phase and sufficient pressure to maintain the liquid phase conditions. The mercuric compound is reduced to metallic mercury by the oxidation and can be recovered and regenerated for reuse.

Description of the invention

This invention relates to a method for preparing amides, in particular, beta-allylaminopropionamides from allyl amines. The products of the reaction are useful for a variety of purposes, e.g., surfactants, as pointed out in Patent No. 2,921,085 or as intermediates for hydrolysis to alpha,beta-unsaturated carboxylic acids or by pyrolysis to alpha,beta-unsaturated amides, also pointed out in Patent No. 2,921,085.

The method of my invention comprises contacting an allylic amine with a mercuric salt or mercuric oxide under relatively mild temperatures and liquid phase conditions. The amine is oxidized and the mercuric cations are reduced to mercury.

The reaction proceeds according to the following:

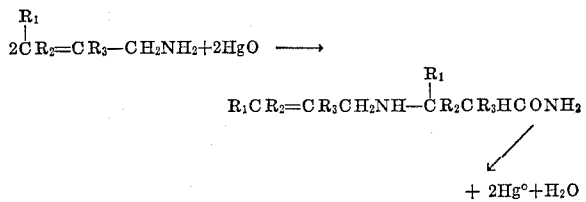

wherein:

$R_1$, $R_2$ and $R_3$ can be hydrogen or alkyl having from 1 to about 12 carbons, e.g., methyl, ethyl, isopropyl, butyl, amyl, hexyl, isooctyl, dodecycl, etc.; and the total of carbon atoms is from 3 to about 20.

Examples of suitable reactants are allyl amine, methyl allylamine, 2-amylallylamine, 2-ethylallylamine, 2-isopropylallylamine, 2-butenylamine, 3-methyl-2-butenylamine, 3-isopropyl-2-butenylamine, 2-hexyl-2-butenylamine, 2-pentenylamine, 3-methyl-2-pentenylamine, 2-hexenylamine, 2-decenylamine, 3-ethyl-2-decenylamine, 2-dodecenylamine, etc. Preferably, the low molecular weight amines having from about 3 to about 10 carbons are used.

The reaction can be conducted in an excess of the reactant amine, the excess serving as the reaction medium. If desired, however, a stoichiometric quantity or greater of the mercuric salt or oxide can be used to insure complete reaction of the amine. Preferably, however, particularly when a high melting point amine is used, an inert diluent is employed that is liquid at the reaction temperatures and inert to the reactants. Examples of suitable organic solvents that can be employed include various ethers such as methyl ethyl ether, diethyl ether, diisoamyl ether, diethylene glycol diethyl ether, triethylene glycol diethyl ether, tetraethylene glycol dimethyl ether, etc.

Various esters can also be employed as solvents, e.g., methyl acetate, ethyl acetate, isopropyl acetate, ethyl propionate, sec-butyl acetate, isobutyl acetate, ethyl butyrate, butyl acetate, isoamyl acetate, amyl acetate, isoamyl butyrate, glycol diacetate, isoamyl isovalerate, dibutyl oxalate, etc.

The saturated hydrocarbons can of course be used as suitable inert solvents, e.g., pentane, heaxne, heptane, octane, dodecane, decane, kerosene, naphtha, etc.

The reaction need not be performed under hydrous conditions and, accordingly, the reaction medium can in part comprise water. Accordingly, aqueous reaction mediums containing up to 50 weight percent water can also be used for the reaction.

The reaction can be performed under relatively mild conditions including temperatures from about 25° to about 350° C., preferably from about 75° to about 225° C. The pressure employed is not critical in the reaction and generally any pressure from about atmospheric to 10,000 p.s.i.g. or more can be employed. Preferably, sufficient pressure is maintained to retain the reactants and/or solvents in liquid phase and thereby insure liquid phase reaction conditions.

The time for the reaction is variable depending upon the aforecited reaction conditions. In general the reaction is rapid and complete within 3 minutes to 5 hours. The progress of the reaction can be monitored by observing the amount of reduced mercury metal in the reaction zone or other techniques can be used to observe the disappearance of a reactant or formation of product and the reaction can be controlled in response to such observation.

Suitable mercuric compounds for the reaction include any soluble mercuric salt or mercuric oxide. Examples of suitable salts are the salts of strong mineral acids such as the nitrate: sulfate; phosphate; etc. Also suitable are salts of low molecular weight ($C_1$–$C_6$) carboxylic acids including the fatty acids, e.g., acetates, propionates, isobutyrates, valerates, etc.; benzoate; etc.

The reaction can be practiced continuously or discontinuously in a batchwise fashion. The reaction employs the amine and mercuric compound in stoichiometric quantities and these reactants can be initially charged to the reaction zone in such proportions. If desired, to facilitate the separation of the crude product, the amine can be used in excess of the stoichiometric amount to thereby insure complete reduction of the mercuric compound to mercury which can be easily separated from the organic product. The crude product obtained can be readily freed of the metallic mercury by decanting the product from the mercury layer and filtering the decanted liquid. When an inert organic reaction medium is employed, the product can be recovered therefrom by conventional techniques, e.g., distillation, crystallization and filtration for the high melting point products, extraction, etc. The mercury can be recovered for reuse by simple oxidation techniques to produce mercuric oxide, e.g., contacting of the mercury with oxygen in the presence of a suitable catalyst such as nitric acid.

The solvent after recovery of the desired product therefrom can be combined with mercuric oxide and with further amine reactant for use in the process. When the reaction is practiced in a batchwise fashion, the reactants are simply charged to the reaction zone which is then heated to the desired reaction temperature while maintaining the necessary pressure to maintain the reactants and solvent in liquid phase. Upon substantially complete reduction of the mercury or other monitored variable the batchwise process can be discontinued and the product recovered in the aforementioned method.

In a continuous process the reactants, solvent and mercuric oxide can be continuously charged to the reaction zone and metallic mercury and liquid product can be continuously withdrawn therefrom, separated, the mercury regenerated for reuse, and the product recovered from the solvent and the mercuric compound and solvent recycled to further contacting.

The following examples will illustrate a mode of practicing my invention and demonstrate results obtainable thereby:

EXAMPLE 1

Into a 300 milliliter capacity pressure bomb was introduced 24 grams methallylamine, 80 milliliters of methyl acetate, 42 grams mercuric oxide and 10 grams of water. The bomb was closed and heated to 200° C. and maintained at that temperature for 4 hours while rocking the bomb to agitate the contents. Upon completion of the reaction period the bomb was cooled, depressured, opened and the liquid contents were separated into a mercury layer, and a liquid layer which was distilled to recover water, methyl acetate, acetic acid and 21 grams of a light yellow liquid with a boiling point at 2 mm. mercury pressure of 86–90° C. refractive index of 1.4644 at 24° C. The infrared spectrum was consistent for beta-methallylamino propionamide. The elemental analysis was 62.2 percent carbon and 10.2 percent hydrogen which corresponds to the calculated values of 61.6 and 10.2 percent, respectively, for the preceding compound. Upon hydrolysis with sodium hydroxide, methallylamine and an acid were obtained.

EXAMPLE 2

To the 300 milliliter bomb was added 24 grams allylamine, 42 grams mercuric oxide and 80 milliliters of methyl acetate. The bomb was closed, heated to 200° C. and maintained at that temperature for 4 hours while rocking to agitate the contents. Upon completion of the reaction period the bomb was cooled, opened and the liquid reactants were separated from a mercury layer and distilled to obtain 16 grams of a light yellow liquid with a refracted index of 1.1459 at 24° C. and a boiling point of 80–85° C. at 2 millimeters mercury. The infrared spectrum of the material indicated a secondary amine and the elemental analysis was 59.0 percent carbon and 9.7 percent hydrogen corresponding closely to the 57.4 and 9.5 values, respectively, for allyl-beta amino propionamide.

Substantially the same results can be obtained when mercuric acetate, mercuric nitrate or other mercuric salts soluble in the reaction medium are substituted for the mercuric oxide of the preceding example.

The preceding examples are intended solely to illustrate the best mode of practicing my invention and to demonstrate results obtainable thereby.

I claim:

1. The oxidation of allylic amines to beta-allylaminopropionamides that comprises contacting an amine having the following structure:

$$CR_1R_2=CR_3CH_2NH_2$$

wherein:

$R_1$, $R_2$ and $R_3$ are selected from the class consisting of hydrogen and alkyl groups having 1 to about 12 carbons and the total number of carbons in the compound is less than about 20 with a soluble mercuric salt of a strong mineral acid, $C_1$–$C_6$ saturated carboxylic acid or mercuric oxide at reaction conditions comprising a temperature from about 25° to 350° C. and a pressure from about atmospheric to 10,000 p.s.i.g., sufficient to maintain liquid phase conditions.

2. The oxidation of claim 1 wherein said amine is allylamine.

3. The oxidation of claim 1 wherein said mercuric compound is mercuric oxide.

4. The oxidation of claim 1 wherein said oxidation is carried out in a substantially anhydrous reaction medium.

5. The oxidation of claim 1 wherein said oxidation is carried out in a reaction medium containing less than about 50 percent water.

6. The oxidation of claim 1 wherein said amine is methallylamine.

7. The oxidation of claim 2 wherein said oxidation is carried out in a substantially anhydrous reaction medium.

8. The oxidation of claim 3 wherein said oxidation is carried out in a substantially anhydrous reaction medium.

References Cited

UNITED STATES PATENTS 3,336,299   8/1967   Fenton _____ 260—239.3

ALEX MAZEL, Primary Examiner.

R. V. RUSH, Assistant Examiner.

U.S. Cl. X.R.

252—357